United States Patent [19]

Sutphin et al.

[11] 4,266,247
[45] May 5, 1981

[54] PROXIMITY FOCUSED STREAK TUBE AND STREAK CAMERA USING THE SAME

[75] Inventors: Howard D. Sutphin; Albert J. Lieber, both of Los Alamos, N. Mex.

[73] Assignee: General Engineering & Applied Research, Palo Alto, Calif.

[21] Appl. No.: 834,561

[22] Filed: Sep. 19, 1977

[51] Int. Cl.³ .............................................. H04N 5/30
[52] U.S. Cl. .................................................... 358/217
[58] Field of Search ...................... 358/209, 217, 23 P, 358/242, 901; 313/105 CM, 95

[56] References Cited

U.S. PATENT DOCUMENTS

| 3,374,380 | 3/1968 | Goodrich | 313/105 CM |
| 3,735,032 | 5/1973 | Goetze et al. | 358/901 |
| 3,974,411 | 8/1976 | Faulkner et al. | 313/105 CM |
| 4,015,115 | 3/1977 | Corcoran | 358/901 |

*Primary Examiner*—Richard Murray
*Attorney, Agent, or Firm*—Flehr, Hohbach, Test

[57] ABSTRACT

Proximity focused streak tube having a photocathode for converting photon images into photoelectrons. A phosphorous screen is provided for receiving the photoelectrons. The photocathode and the phosphorous screen define a longitudinal tube axis. A passive channel plate is provided which has a plurality of parallel bores therein. The channel plate is disposed in relatively close proximity to the photocathode and so that the bores are inclined at an angle with respect to longitudinal tube axis so as to minimize feedthrough of visible photons. A source of voltage is connected between the photocathode and the passive channel plate causing the photoelectrons to be extracted from the photocathode and to pass through the bores in the channel plate. First and second spaced apart beam electrodes are disposed between the channel plate and the phosphorous screen. Another voltage source is utilized for applying a voltage differential between the beam electrodes to cause the photoelectrons to move in the direction across the screen. The beam electrodes are arranged asymmetrically of the tube axis to compensate for the inclination of the channel plate with respect to the tube axis. The passive channel plate is very flat so that the voltage differential which is applied between the photocathode and the channel plate can be relatively high to provide a high electron field. A fiber optic input is utilized which is also inclined at an angle with respect to the longitudinal tube axis so that the fiber optic bundles are in alignment with the bores provided in the faceplate. A fiber optic output window is provided which carries the phosphorous screen and provides the luminous streaked images which are photographed.

6 Claims, 12 Drawing Figures

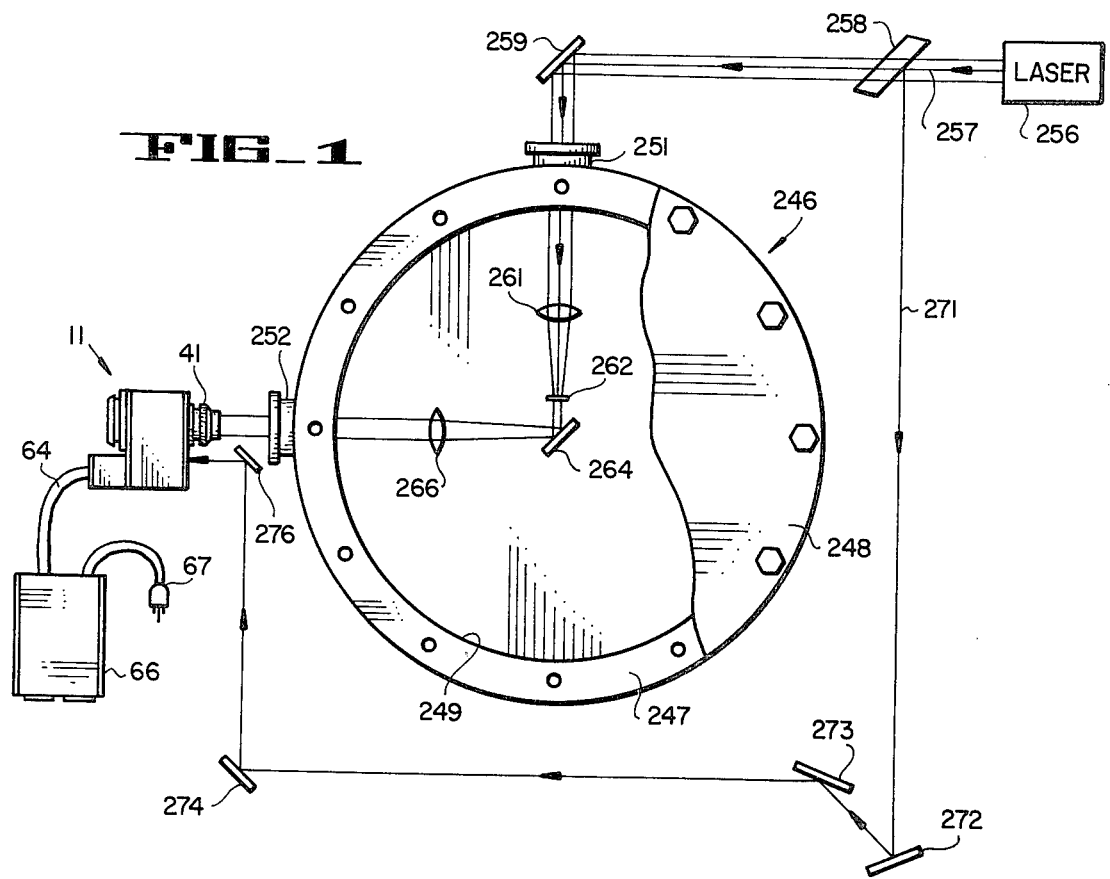
FIG_1
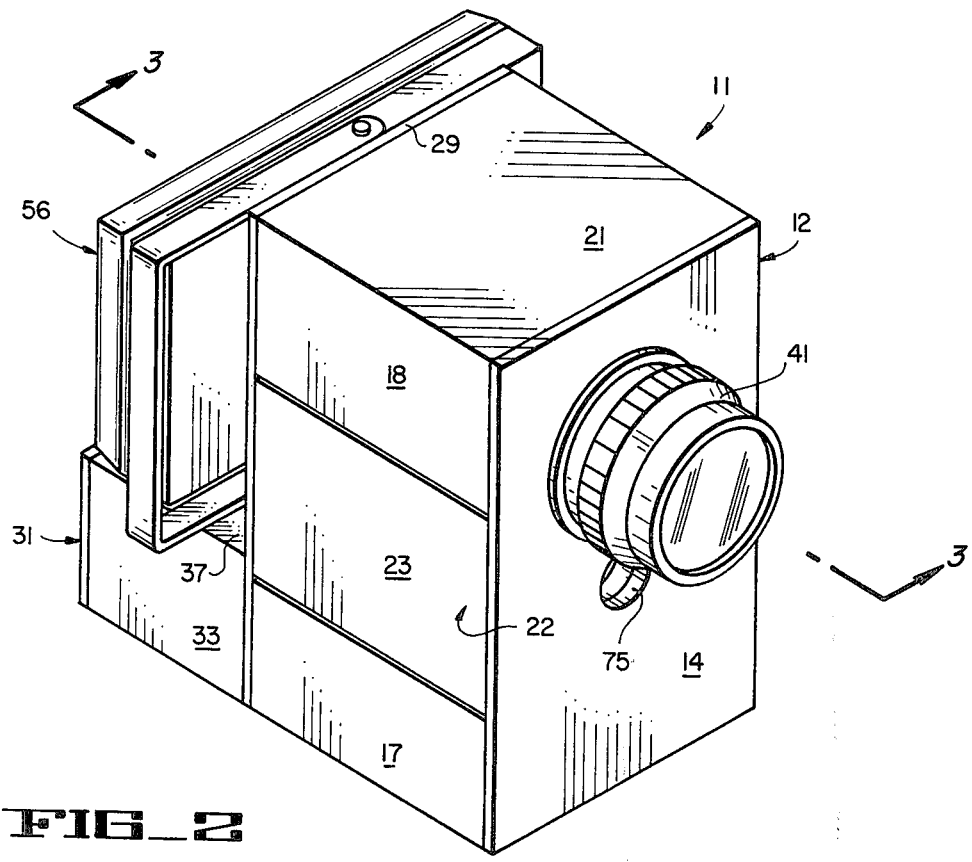
FIG_2

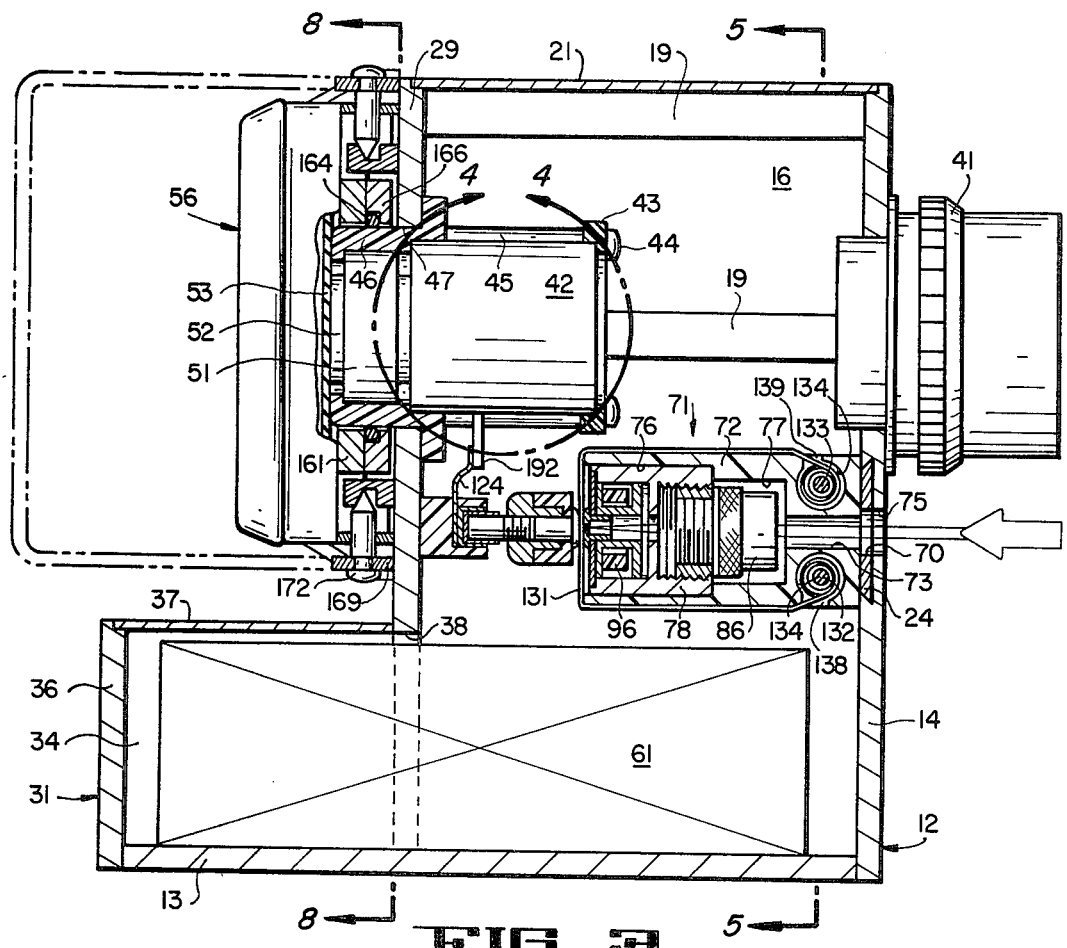
FIG_3
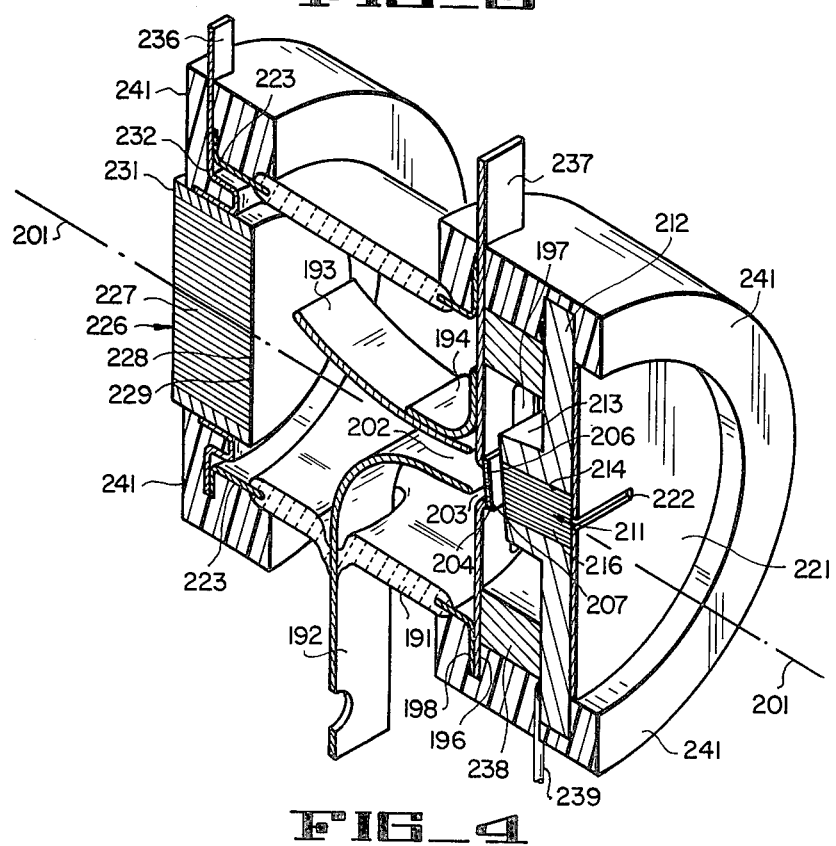
FIG_4

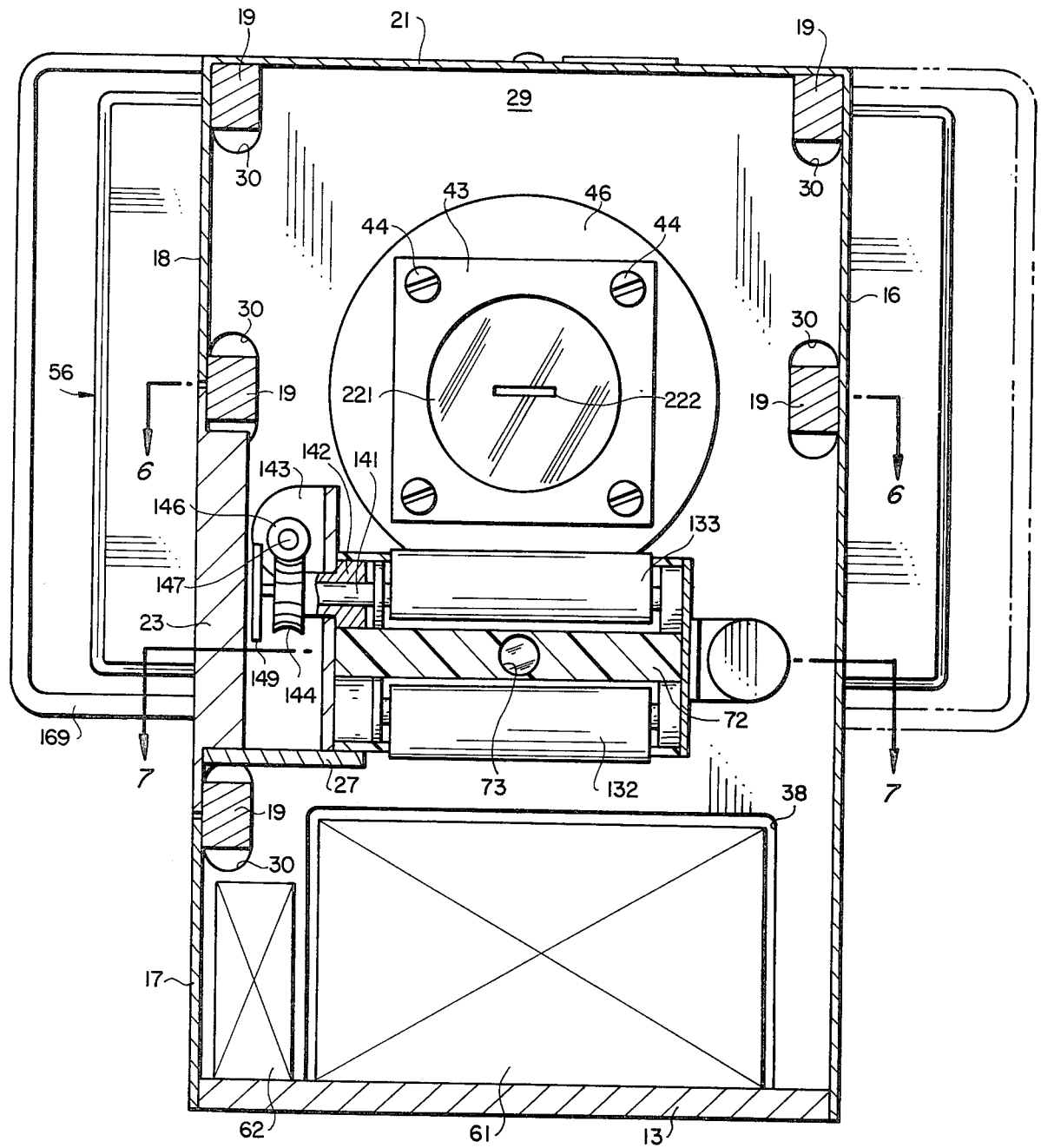
FIG_5

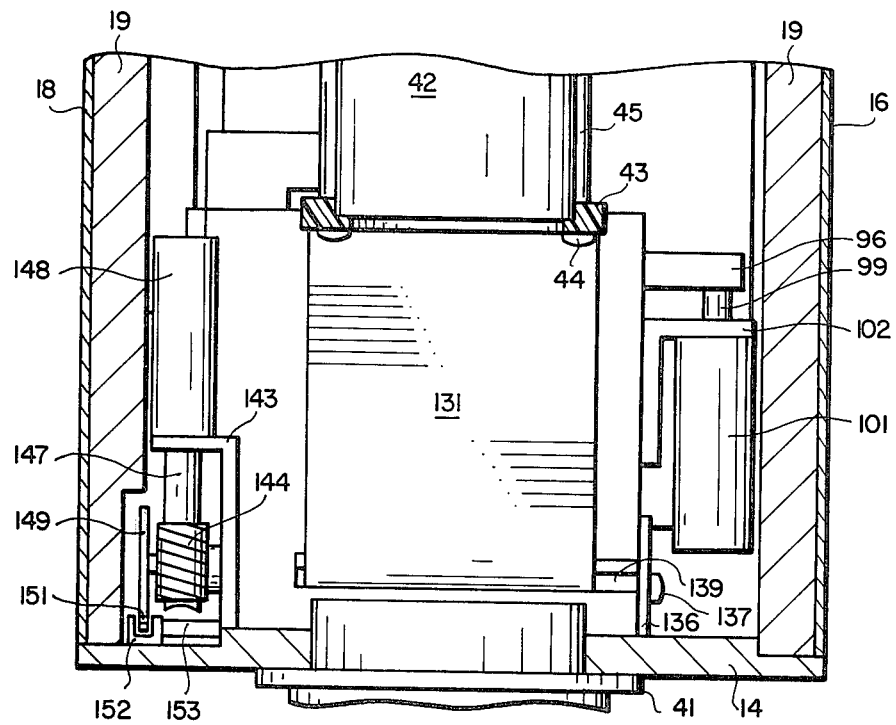
FIG_6
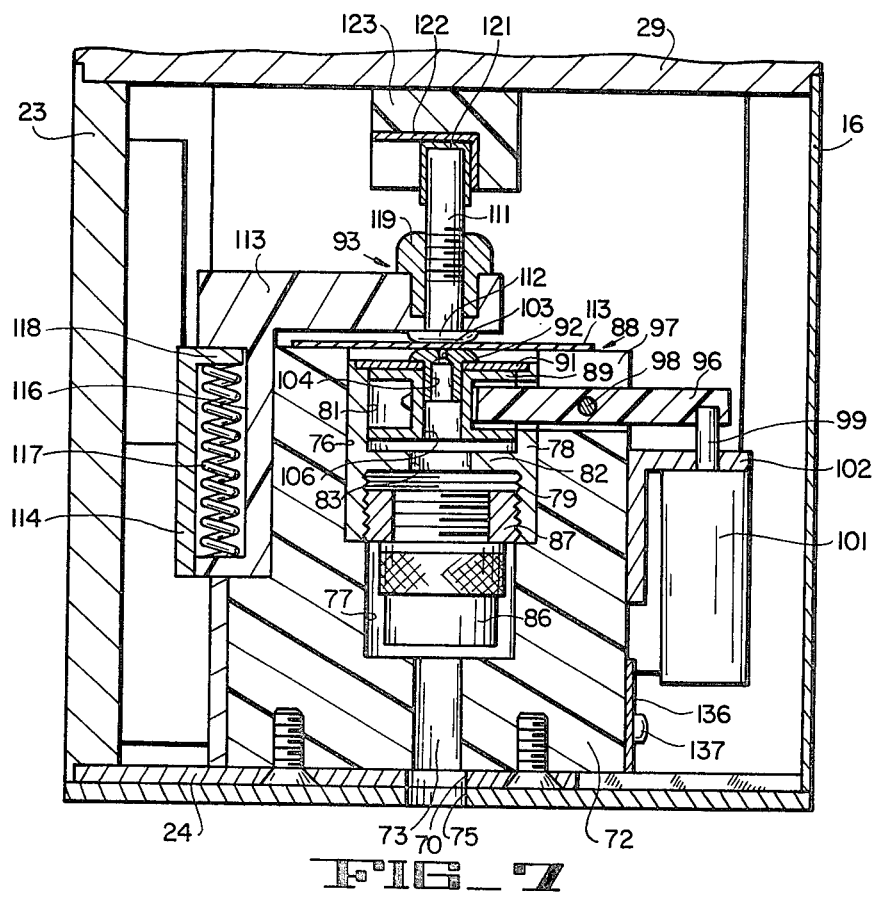
FIG_7

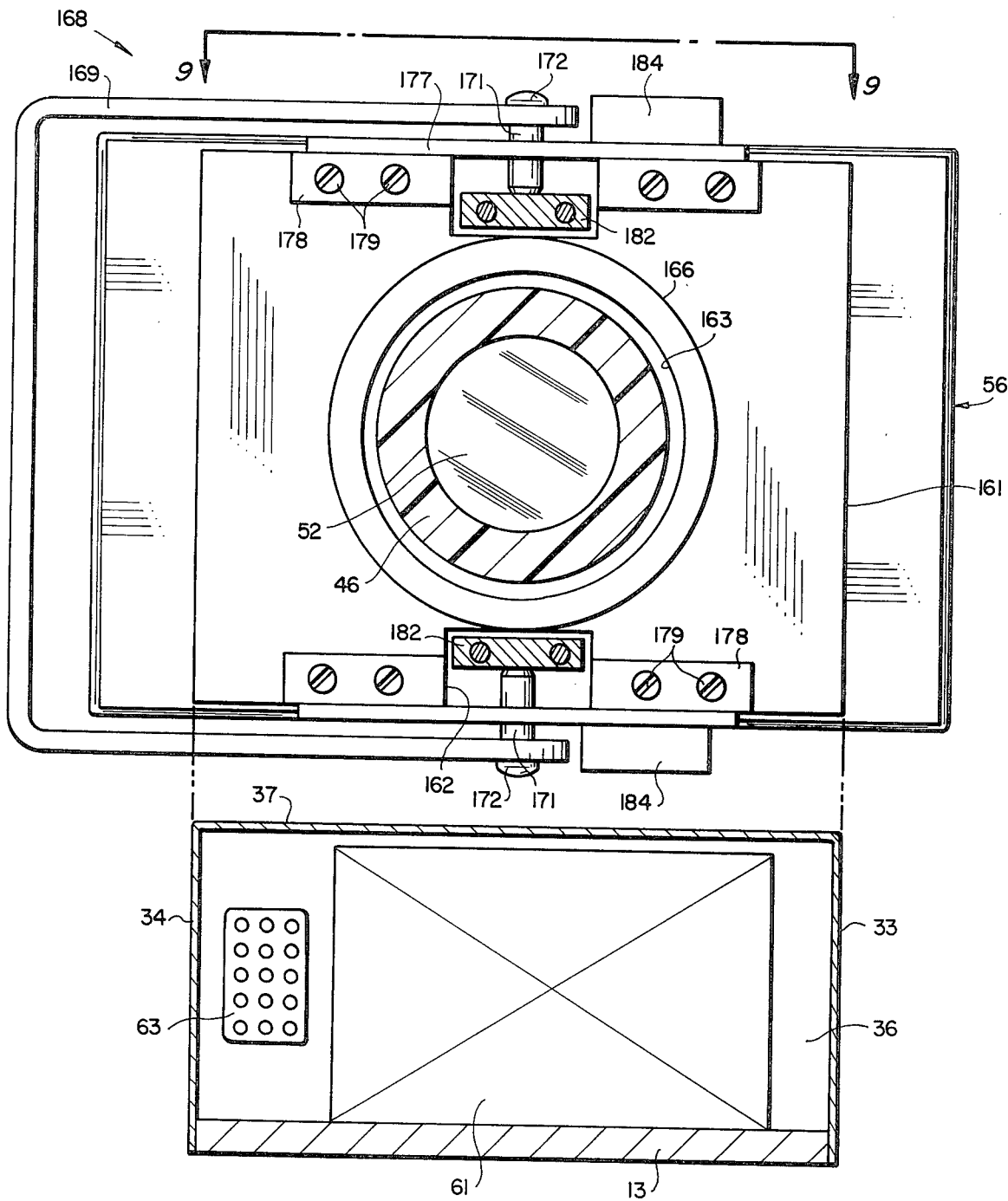
FIG_9

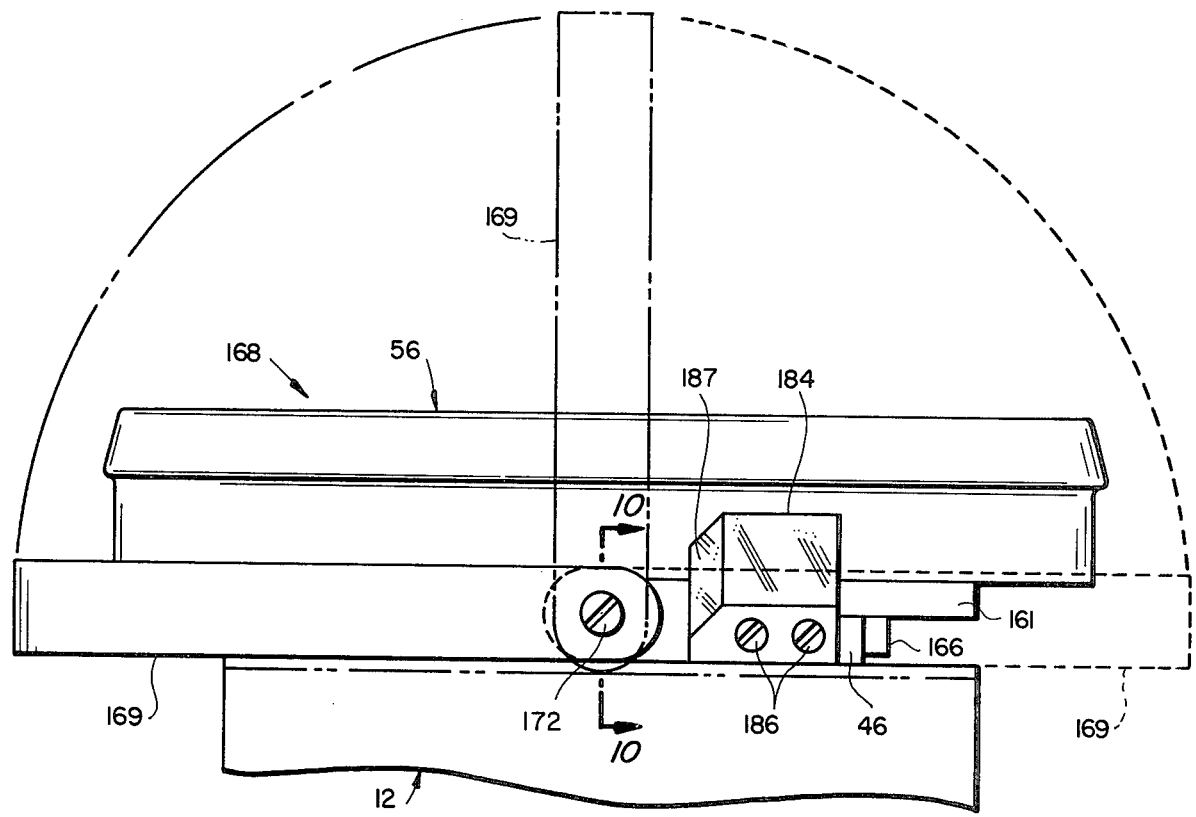
FIG_9
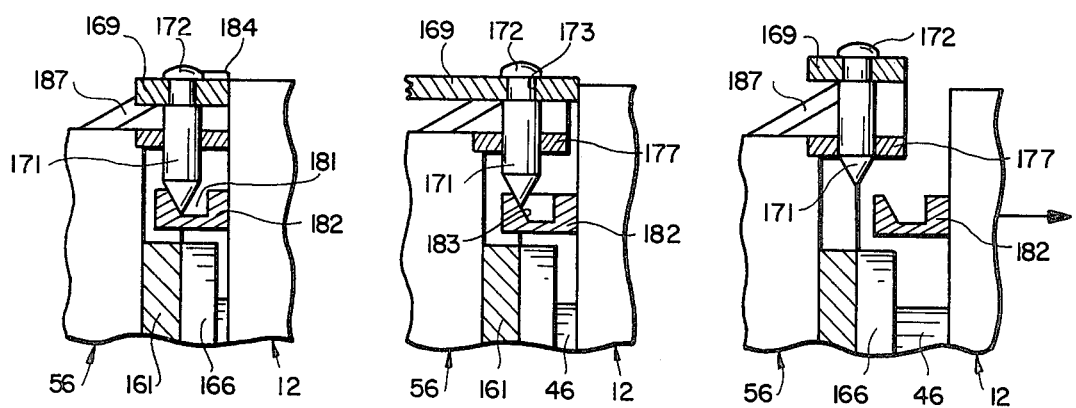
FIG_10a  FIG_10b  FIG_10c

PROXIMITY FOCUSED STREAK TUBE AND STREAK CAMERA USING THE SAME

BACKGROUND OF THE INVENTION

In Bradley U.S. Pat. No. 3,761,614 there is disclosed an electron-optical image tube and an image tube streak camera. The image tube utilizes a flat photocathode and an extraction mesh electrode which is parallel to the photocathode. It has been found that the use of such an electron mesh electrode limits the voltage which can be applied between the electrode and the photocathode.

In copending application, Ser. No. 755,226, filed on Dec. 29, 1976, now U.S. Pat. No. 4,120,002, there is disclosed a streak tube which utilizes a channel plate. However, the arrangement is such that it is possible for direct feedthrough of x-rays and visible photons to the phosphorous screen to occur which is undesirable. There is, therefore, a need for a new and improved streak tube particularly useful for visible light and a camera for utilizing the same.

SUMMARY OF THE INVENTION AND OBJECTS

The proximity focused streak tube for visible light consists of a photocathode for converting photon images into photoelectrons. A phosphorous screen is provided for receiving the photoelectrons. The photocathode and the screen define a longitudinal tube axis. A passive channel plate having a plurality of parallel bores therein is disposed in relatively close proximity to the photocathode. The channel plate is positioned in such a manner so that the bores are inclined at an angle with respect to the longitudinal tube axis so as to minimize feedthrough of visible photons. Means is provided for applying a voltage differential between the photocathode and the passive channel plate to cause photoelectrons to be extracted from the photocathode. First and second spaced apart beam electrodes are disposed between the channel plate and the phosphorous screen. Means is provided for applying a voltage differential between the beam electrodes to cause the photoelectrons to move in a direction across the screen. The beam electrodes are arranged asymmetrically with respect to the tube axis to compensate for the inclination of the channel plate. Fiber optic input and output windows are provided.

In general, it is an object of the present invention to provide a proximity focused streak tube which is particularly useful for visible light.

Another object of the invention is to provide a streak tube of the above character in which the bores of the channel plate are inclined with respect to the tube axis to minimize direct feedthrough of visible photons.

Another object of the invention is to provide a streak camera of the above character in which the channel plate is very thin.

Another object of the invention is to provide a streak tube of the above character in which the channel plate is very flat to permit a higher extraction voltage to be applied thereto.

Another object of the invention is to provide a streak tube of the above character in which the bores in the channel plate are spaced to minimize the magnification and blocking of the electron beam.

Another object of the invention is to provide a streak tube of the above character which is relatively short and which depends upon focusing by keeping the phosphorous screen in relatively close proximity to the photocathode.

Another object of the invention is to provide a streak tube of the above character in which it is unnecessary to utilize pinholes or lenses.

Another object of the invention is to provide a streak tube which utilizes a high electric field for extracting the photoelectrons from the photocathode.

Another object of the invention is to provide a camera utilizing a streak tube of the above character which is easily used.

Another object of the invention is to provide a camera of the above character which utilizes a spark gap generator which is readily accessible.

Another object of the invention is to provide a camera of the above character in which a conventional flat film pack can be used with minor modifications.

Additional objects and features of the invention will appear from the following description in which the preferred embodiment is set forth in detail in conjunction with the accompanying drawings.

BRIEF DESCRIPTION OF THE DRAWINGS

FIG. 1 is a top plan view of an experimental test system utilizing a proximity focused streak camera of the visible type incorporating the present invention.

FIG. 2 is an isometric view of a proximity focused streak camera shown in FIG. 1.

FIG. 3 is a cross-sectional view taken along the line 3—3 of FIG. 1.

FIG. 4 is a cross-sectional isometric view of a streak camera incorporating the present invention and which is encircled by the line 4—4 in FIG. 3.

FIG. 5 is a cross-sectional view taken along the line 5—5 of FIG. 3.

FIG. 6 is a cross-sectional view taken along the line 6—6 of FIG. 5.

FIG. 7 is a cross-sectional view taken along the line 7—7 of FIG. 5.

FIG. 8 is a cross-sectional view taken along the line 8—8 of FIG. 3.

FIG. 9 is a view taken along the line 9—9 of FIG. 8.

FIGS. 10a, b and c are cross-sectional views taken along the line 10—10 of FIG. 9 showing the various positions of the handle mechanism.

DESCRIPTION OF THE PREFERRED EMBODIMENT

The streak tube camera 11 of the present invention is shown in FIG. 2 and consists of a chassis or a case 12 formed of a suitable material such as aluminum. The case is provided with a base plate 13 of a suitable dimension as for example, 5 inches by 8 inches and ¼ inch in thickness. The case 12 also includes a front plate 14 which is secured to the base plate and a side plate 16 which is secured to one side of the base plate and first and second side plates 17 and 18 with the side plate 17 being secured to the base plate 13. A plurality of spaced bar-like longitudinal members 19 are carried by the sidewalls 16, 17 and 18. A top plate 21 is secured to the side plate 16 and 18. A drawer 22 forms a part of the case 12 and is mounted between the side walls 17 and 18 and consists of an outer or front plate 23 the outer surface of which is flush with the outer surfaces of the side plates 17 and 18. The drawer is also provided with a side plate 24 and a bottom plate 27. It can be seen that the bar-like members 19 secured to the plates 17 and 18 serve as stops to prevent further inward travel of the drawer. The rear plate 29 is secured to the side plates 16, 17 and 18. The bar-like members 19 extend into cutouts 30 provided in the rear plate 29. A rear case 31 is secured to the rear lowermost extremity of the case 12. This case 31 is provided with side walls 33 and 34, a rear wall 36 and a top wall 37. The side walls 33 and 34 are secured to the base plate 13. The rear wall 29 is provided with a cutout 38 opening with the rear case 31.

The visible light which is to be photographed by the camera passes through a lens assembly 41 mounted upon the front wall 14 of the case 12. The light passing through the lens assembly 41 is imaged onto a streak tube 42 suitable for visible light which incorporates the present invention. The streak tube 42 is supported on the rear plate by a cap 43 formed of a suitable insulating material such as a plastic which is secured by four screws 44 to insulating posts 45 secured to a black epoxy casting 46. The casting 46 is mounted in a hole 47 provided in the rear wall 29. An image intensifier 51 of a conventional type is mounted within the casting 46 and is immediately adjacent to the output of the streak tube 42. The output of the image intensifier 51 is provided with a fiber optic face plate 52 which is adapted to be engaged directly by film 53 lying in a film plane immediately adjacent the fiber optic face plate 52. The film 53 can be provided from a conventional source as for example a standard Polaroid flat pack 56.

A large 20 KV power supply 61 is provided in the lower portions of the case 12 and extends into the rear case 31 through the cutout 38. Another smaller 5 KV power supply 62 is also provided within the case 12. A connector 63 of a conventional type is mounted on the rear wall and is adapted to be connected to a control cable 64 (see FIG. 1), which is connected to a control console 66. The control console 66 is adapted to be connected to a suitable power supply as for example 110 volts AC by a power cord 67.

A solid dielectric spark gap assembly 71 is mounted in the drawer 22. The spark gap assembly 71 is substantially identical to the spark gap assembly described in copending application Ser. No. 834,466, filed Sept. 19, 1977. As described therein, it consists of a block 72 formed of a suitable insulating material such as Lucite. The other end of the block 72 is provided with a central bore 73 so that the trigger laser beam can pass therethrough. The side wall 24 of the drawer 22 is provided with a hole 70 which is in registration with the bore 73. The hole 70 in the drawer 22 can be moved into registration with a hole 75 provided in the front wall 14.

The other end of the block 72 is provided with a relatively large bore 76 which extends inwardly towards the other end and which is in communication with a smaller bore 77 also provided in the block 72. The bores 76 and 77 are concentric with the bore 73. A body 78 formed of a suitable conducting material such as brass is disposed within the large bore 76. The body 78 is provided with a threaded bore 79 and another bore 81 which are separated by a wall 82. The wall 82 has a hole 83 formed therein. A lens holder 86 is threaded into a brass collar 87 which is threaded into the bore 79. The lens holder 86 carries a lens (not shown) which is of short focal length for focusing the laser beam at a point as hereinafter described.

A movable contact electrode assembly 88 is mounted in the bore 81 and includes a spool-like armature 89 which is slidably disposed within the bore 81. A star-shaped contact member 91 formed of a suitable material such as beryllium copper is secured to the armature 89 by a generally cylindrical electrode 92 formed of a suitable material such as molybdenum. The outer extremities of the star-shaped contact member 91 are secured to the brass body 78 by a suitable means such as welding so that there is good electrical contact between the body 78 and the contact member 91. Electrode 92 serves to retain the center part of the contact member 91 in engagement with the spool-like armature 89. The star-shaped contact member 91 is formed of a springy material so that the contact electrode 92 carried thereby is urged towards a fixed contact assembly 93 hereinafter described.

Means is provided for moving the movable electrode assembly 88 away from the fixed contact assembly 93 and consists of a forked arm 96 which extends on both sides of the spool-like armature 89 (see FIGS. 3 and 7). The arm 96 extends through a slot 97 provided in the block 72. The arm 96 is pivotally mounted on a pin 98 carried by the block 72. The outer end of the arm 96 is engaged by a plunger 99 of a solenoid 101 which is secured to a bracket 102 mounted on the block 72. The plunger 99 is of a pusher type and when the solenoid is energized, it pushes the outer extremity of the arm 96 upwardly as viewed in FIG. 7 so that the movable electrode assembly 88 is moved away from the fixed electrode assembly 93 for the purpose hereinafter described.

The electrode 92 is provided with a small hole 103 which is in registration with a bore 104 provided in the electrode. The bore 104 is concentric with a hole 106 which extends through the spool-like armature 89.

The other or fixed contact assembly 93 consists of a contact member in the form of a screw 111 in which the head 112 of the screw serves as the contact surface. The screw 111 extends through an L-shaped slide 113 formed of a suitable material such as plastic. The slide 113 is slidably mounted in the block 72 and is yieldably retained therein by a cover plate 114 that is secured to the block 72. The slide 113 is provided with a recess 116 which has a spring 117 mounted therein. One end of the spring 117 is engaged by a tab 118 provided on the cover plate 114. By providing such construction it is possible to move the screw 111 with its contact surface away from the electrode 92. The screw 111 is threaded into a nut 119 which is seated in one end of the slide 113 so that the screw 111 is firmly held in place. A spring-like contact sleeve 121 is carried by the outer extremity of the screw 111. It is adapted to engage a cut-shaped contact receptacle 122 open at one side (see FIG. 7) and is formed of a conducting material. The receptacle 122 is carried by another cup-shaped member 123 formed of an insulating material which is secured to the rear wall 29. The conducting receptacle 122 is electrically connected to a flexible copper strap 124 soldered thereto. The flexible copper strap 124 is connected to one electrode of a streak tube 42 as hereinafter described.

It can be seen that the connection between the screw-like electrode 111 and the receptacle 122 is a slide fit so that the drawer 22 can be pulled out of the case 12 and carry with it the solid electric spark cap assembly 71 merely by separating the two parts. Similarly, when the drawer 22 is moved into the case 12 by movement of the dove-tailed side wall 24 in the front wall 14, the screw-like electrode 111 can be readily inserted into the fixed receptacle 122.

A strip 131 formed of a suitable dielectric material such as Mylar is adapted to be inserted between the head 112 of the screw 111 and the electrode 92. A supply of strip 131 is provided and means is provided for progressively advancing the strip between the electrodes. This means consists of a supply spool 132 and a take-up spool 133 rotatably mounted in cylindrical bores 134 provided in the block 72. The spools 132 and 133 are retained within the bores 134 by a cover plate 136 secured to the block 72 by a screw 137 (see FIG. 7). A supply of the Mylar film 131 is carried by the spool 132 and is supplied from the spool through a slot 138 provided in the body 72 and then extends outwardly around the outside of the block 72 over the top of the block 72 between the contact elements or electrodes 92 and 111 and then down the other side of the block 72 through another slot 139 to the take-up spool 133. The take-up spool 133 is driven by a shaft which extends through a bushing 142 provided in the block 72. The shaft 141 also extends through a motor mounting bracket 143 that is secured to the block 72. A worm gear 144 is secured to the shaft 141 and is driven by a worm 146. The worm 146 is mounted on the output shaft 147 of a small motor 148 of a conventional type such as a 5-volt DC motor with a gear reduction provided therein.

Means is provided for counting the revolutions of the shaft 141 which drives the take-up spool 133 and consists of a small disc 149 which is secured to the shaft 141 and rotates with the shaft 141. The disc 149 is provided with a plurality of holes 151 spaced circumferentially around the outer margin of the disc 149. A slotted switch 152 is utilized for counting the number of holes which pass through the slotted switch and is carried by a bracket 153 secured to bracket 143.

By way of example, the Mylar utilized for the strip 131 in one embodiment of the invention had a width of approximately two inches and had a thickness of one mil. The length of the Mylar strip was approximately 100 inches which gave the capability of giving at least 100 shots of the type hereinafter described before it was necessary to reload the Mylar. In the mechanism hereinbefore described, it can be seen that it is only possible to advance the Mylar strip in one direction. Thus the Mylar strip is taken from the supply reel 132 and supplied into the take-up reel 133. As soon as all the strip has been moved from the supply reel to the take-up reel, it is necessary to reload a new strip of Mylar into the solid dielectric spark cap assembly 71.

The Mylar can be loaded into the solid dielectric spark gap assembly 71 by pulling out the drawer 22 with the spark gap assembly 71 therein. The cover 136 can be removed and thereafter the supply and take-up spools 132 and 133 can be removed. The supply spool 132 can be put in place and the Mylar can be readily threaded between the contact electrodes 92 and 111 by engaging the slide 113 and moving it against the force of the spring 117 to separate the contact elements and to make it possible to readily insert the Mylar strip in the same and to connect it to the take-up spool 133. This arrangement makes it necessary to operate the solenoid 101 in order to load the Mylar into the gap provided between the electrodes 92 and 111. In operation of the solenoid 101, it has been found that it only is necessary to move the armature by a very small amount, i.e. to 10 to 20 mils, in order to relieve the pressure sufficiently between the contact elements so that the Mylar strip 131 is not scratched or otherwise damaged when it is moved.

It should be appreciated that the electrical path provided in the solid dielectric spark gap assembly 71 provides a low inductance path for a suitable negative voltage as for example, a minus 5 kilovolt pulse to operate the streak tube as hereinafter described.

By way of example, it has been found desirable to form the electrodes 92 and 111 so that they are approximately ⅜ of an inch in diameter so as to provide a low inductance. With electrodes of such diameter, it is desirable to move the Mylar strip 131 a sufficient distance so as to provide a minimum of approximately 10,000 volts in breakdown capabilities between the holes provided in the Mylar film by the spark gap assembly 71 as hereinafter described. To accomplish this, it is desirable to move the strip by approximately ¾ of an inch to one inch. This movement is controlled by conventional electronics by ascertaining the movement of the film by counting the holes 151 in the disc 149 by the slotted switch 152.

The mounting of the Polaroid flat pack 56 on the case 12 will now be described. The flat pack is of the conventional type and is provided with an adapter plate 161. The adapter plate 161 is provided with a pair of cut-outs 162. It is also provided with a hole 163 through which the casting 46 surrounding the image intensifier 51 extends. Means is provided for establishing a light-tight seal between the adapter plate 161 and the epoxy casting 46 for the image intensifier tube and consists of an O-ring 164 surrounding the casting 46 which is held in place by an O-ring retainer 166.

A handle mechanism 168 is mounted on the adapter plate 161 and is utilized in connection with the flat pack as hereinafter described. The handle mechanism consists of a U-shaped member or handle 169 which has a pair of oppositely facing pins secured off center (see FIG. 9) to the outer extremities thereof by screws 172 which are threaded therein and which extend rotatably through holes 173 provided in the member 169. The plates 177 are secured to the adapter plate 161 by suitable means such as by securing the same to blocks 178 secured to the adapter plate 161 by screws 179. The pivot pins 171 are pivotally mounted in recesses 181 provided in blocks 182. The blocks 182 are secured to the rear wall 29 by suitable means such as screws (not shown). The recesses 181 are formed such that a rear wall 183 thereof is inclined (see FIGS. 10a, 10b and 10c). A strike plate 184 is secured to the adapter 161 by suitable means such as screws 186. The adapter plate 161 is provided with an inclined surface 67 which is adapted to be engaged by the U-shaped member or handle 169 for a purpose hereinafter described.

When the handle 169 of the handle mechanism 168 is in the solid line position as shown in FIG. 9, the flat pack 56 is held so that the film 53 carried thereby is in relatively tight-fitting engagement with the fiber optic face plate 52 of the image intensifier 51. When this is the case, the handle 169 is in a position so as to prevent the film 53 from being pulled across the fiber optic face plate 52 and causing damage to the same. By moving the handle 169 through approximately ninety degrees to the broken line position shown in FIG. 9, the pull tabs associated with the film pack are accessible so that another sheet of film can be advanced in the film pack. When the handle 169 is rotated through the ninety degrees, the pivot pins 171 are rotated eccentrically in the recesses 181 to cause a sidewise pressure to be applied to the pivot pins which causes the pivot pins to ride up on the inclined surfaces 183 and therefore to move the film pack 56 and the film 53 carried thereby away from the fiber optic face plate of the image intensifier. As soon as his has been accomplished, the pull tab in the film pack in be pulled out to place the next sheet of film in place. The handle 169 then can be moved back to the solid line position shown in FIG. 9 to again permit the film pack to move the film 53 into engagement with the fiber optic face plate 52.

Now let it be assumed that it is desired to remove the film pack from the camera 11. When this is the case, the handle is rotated from the broken line position ninety degrees from the solid line position as shown in FIG. 10 to the position in which it has been moved through 180 degrees by another broken line position as shown in FIG. 9. When this is accomplished, the handle 169 strikes the inclined surface 187 of the block 184 which causes the handle with the pivot pins 171 to be cammed outwardly so that the pivot pins 171 completely clear the recesses 181 provided in the blocks 182. When this is the case, the film pack with the handle assembly can be separated from the camera to permit the replacement of the film pack. As soon as the film pack has been replaced, the film pack and holder 156. and the handle assembly 168 can be repositioned on the camera by merely placing the handle 169 in the broken line position as shown in FIG. 9, 180 degrees removed from the solid line position with the pins overlying the recesses 181. The handle 169 can then be rotated through 180 degrees to permit the pivot pins to seat within the recesses 181 and to bring the film 53 into engagement with the fiber optic face plate 52.

The construction of the streak tube 42 is shown in detail in FIG. 4 and as shown therein consists of an envelope or body 191 formed of a suitable insulating material such as Pyrex glass. A pair of streak electrode deflection plates 192 and 193 also called beam electrodes are provided within the envelope or body 191. These plates are formed of a suitable material such as Kovar. As shown, the beam electrodes 192 and 193 can be formed to provide a curved profile and are formed from plate material having a width of approximately 2 centimeters and a thickness of approximately 1/16 inch. The deflection plate 192 extends through the envelope or body 191 and is directly connected to the flexible copper strip 124 which is connected to the solid dielectric spark cap assembly 71. The beam electrode 192 is supported by the glass envelope 191 and is therefore insulated from the remaining parts of the streak tube 42. The beam electrode 193 is supported by a curved support plate 194 which is secured to the plate 193 by suitable means such as spot welding. The curved support plate is secured to a disc-like support plate 196 formed of a suitable material such as Kovar. The support plate 196 is provided with a moon-shaped cutout 197 to prevent communication through the plate 196. Seals 198 formed of a suitable material such as Kovar form a bond between the plate 196 and the glass envelope 191. The inner surfaces of the beam electrodes 192 which face each other are polished and are coated with a suitable high conducting metal such as gold. The beam electrodes 192 are formed so that they have profiles which are asymmetric with respect to the longitudinal tube axis 201 for reasons hereinafter pointed out. In other words, in cross section as shown in the drawing, the beam electrode 192 has a profile which is curved away from the tube axis 201 at an angle which is progressively greater than that for the beam electrode 193.

The beam electrodes 192 and 193 are positioned in such a manner so that they form an entrance slot 202 having a predetermined spacing as for example, 0.125 inches. A disc-like support plate 196 is provided with a centrally disposed slot 203 which is opposite the slot 202.

A microchannel plate collimator 204 hereinafter called an MCP collimator is secured to the disc-like support plate 196 so that it covers the slot 203. Such a microchannel collimator can be made by several methods. One method is described in copending application Ser. No. 834,466, filed Sept. 19, 1977 which utilizes two types of glass. For channel plates for use with visible light, it has been found that square channels or bores are preferred with the channel plate being as thin as possible as for example 0.015 of an inch. The channel plate is coated with a suitable metal such as Iconel and is plated in such a manner that the channels or bores are plated to a depth of at least several diameters. It has been found that the microchannel plate can be very thin because in the visible region it has been found that the microchannel plate does not have to act as a collimator because the photoelectrons are "born" with such small energy distributions that the streak tube of the present invention will produce up to 5 lp/mm without trimming their transverse velocities. By way of example, such a collimator 204 can be provided with a plurality of bores or channels 206 formed into an array 207. The array 207 can have a suitable size as for example a length of approximately 1½ centimeters and a width of approximately ⅛ centimeter. The array of square microchannels can be approximately twelve microns flat to flat. The channel plate 204 is positioned in such a manner that the holes or bores 206 provided in the collimator are extending in a direction which is approximately 10° off axis so as to prevent direct feed through of visible light. This is done to prevent direct feed through of photons through the channel plate 204. The channel plate 204 is positioned in such a manner so that the bores or channels 206 are inclined at an angle from the tube axis 201 by a suitable angle ranging from 5° to 15° but preferably in the vicinity of approximately 10°.

A fiber optic photocathode structure 211 is positioned in close proximity to the microchannel plate collimator 204. This fiber optic photocathode 211 is mounted in a circular plate 212 formed of a suitable metal such as Monel. The plate 212 is provided with an extension 213. The plate has formed therein a rectangular slot 214 which has positioned therein the fiber optic photocathode 211. The fiber optic photocathode is formed of conventional fiber optics with a plurality of fibers 216 extending in parallel planes. The fibers 216 are mounted within the slot 214 in such a manner so that they are also inclined at a suitable angle as for example the same angle as the bores or channels 206 in the channel plate collimator 204. The inner surfaces of the fiber facing the channel plate 204 are provided with a coating of a conventional type which serves as a photocathode.

Means is provided for forming a slit on the exterior of the fiber optic photocathode 211 and consists of a circular plate 221 which has an elongate slit 222 formed therein. The plate 221 is placed in intimate contact with the fiber optic photocathode 211 and is positioned in such a manner so that the slit 222 extends transversely across the fiber optic photocathode 211. The slit 222 is positioned so that the longitudinal axis of the tube extends through the same.

A fiber optic face plate 226 is provided which is formed in a conventional manner. It is provided with a plurality of spaced parallel fibers 227. A layer 228 is provided on the inner surface of the fiber optic face plate. This layer 228 serves as a screen and is formed of a suitable material such as a P-11 phosphor. The screen 228 is covered with a thin metallic layer 229 of a suitable material such as aluminum which is also blackened. The fiber optic face plate 226 is supported by a ring 231. The ring 231 is carried by a flange 232 formed of a suitable material such as Kovar. A seal ring 233 serves to bond the flange 232 to the envelope 191. The fiber optic face plate 226 makes direct contact with the image intensifier 51.

A tab 236 is connected to the Kovar flange 232 and is normally connected to a ground. Another tab 237 is secured to the disc-like support plate 196 which is also normally connected to ground. A ring 238 formed of a suitable high insulating material such as ceramic supports the plate 212 on the disc-like support plate 196. A wire 239 is connected to the plate 212. A potting compound 241 is provided which covers the seals 223 and 198 as well as the ring 238 and the outer extremity of the disc-like support plate 196 so that only the tabs 236 and 237 and the wire 239 extend outwardly therefrom. The beam electrode 193 is connected to a suitable source of voltage as for example $-5$ KV and the photocathode is connected to a suitable source of voltage such as $-10$ KV.

Operation of the streak camera 11 can now be briefly described in conjunction with a typical experiment such as that shown in FIG. 1. The vacuum chamber 246 shown in FIG. 1 is of a conventional cylindrical type and consists of a cylindrical vessel 247 which is provided with a removable lid 248. A chamber 249 is provided within the vessel 247 and is adapted to be pumped down to a desired high vacuum as for example $10^{-5}$ or $10^{-6}$ Torr. Windows 251 and 252 are provided in the vessel. A conventional laser 256 is utilized which provides a conventional type of visible laser beam 257. The laser beam 257 passes through a beam splitter 258. The beam is then reflected by a first or front surface mirror 259 through the window 251 through a focusing lens 261 onto a planar aluminum foil target 262.

In such experiments, high power laser beams are directed to the foil planar target to create high pressures. In other words, the laser beam generates a shock wave at extremely high pressure on one side of the target. This extremely high pressure shock wave travels with a high velocity through the material so that when it arrives at the rear surface of the material, light is emitted in the visible spectrum. The arrival time of this light and its subsequent structure in time is of interest in examining the state of material under these abnormal conditions.

The light which is emitted from the material being examined is picked up by a first or front surface mirror 264 and is directed through a lens 266 to the window 252 and onto the lens 41 of the camera 11. The visible light passes through the slit 222 provided in the plate 221 so that the light is coupled to the photocathode directly through the fibers 216 of the fiber optic photocathode 211. This eliminates a glossy image. It also eliminates the need for expensive image lenses in front of the camera.

The beam splitter 258 provides a trigger beam 271 which is reflected by first surface mirror 272 onto a length-of-path adjusting first surface mirror 273. The trigger beam 271 is then directed onto another first surface mirror 274 and still another first surface mirror 276 into the camera 11 through the hole 75 in the front wall 14 of the camera for triggering the spark gap assembly 71. As explained in copending application Ser. No. 834,466, filed Sept. 19, 1977, the dielectric spark gap assembly 71 makes it possible to provide very high trigger speeds. These trigger pulses are supplied to the beam electrodes 192.

The photoelectrons, which are created by the fiber optic photocathode 211 when the laser beam impinges the same through the slot 222 are rapidly accelerated through the channel plate 204 because of the high voltage differential between the photocathode and the microchannel plate 204 which creates a very high electric field. These photoelectrons travel through the microchannel plate 204 and enter the slot 202 between the beam electrodes 192 and 193. The beams which are created because of the off-axis alignment of the fiber optic photocathode 211 and the microchannel plate 204 create beams which are also off axis as for example by an angle of 10° as they begin to pass through the beam electrodes 192 and 193. However, because of the asymmetry of the profiles provided by the two beam electrodes, the photoelectrons are rapidly brought into a path or trajectory which is substantially parallel to the axis of the tube. In addition, the voltage differential applied across the beam electrodes 192 and 193 causes the beams of photoelectrons to be swept across the surface of the phosphor plate to cause a luminous streaked image to be formed thereon. These luminous streaked images are conveyed by the fiber optic face plate 226 to the image intensifier 51 which supplies luminous streak images to the film 53 carried by the flat pack so that the same can be photographically recorded. As soon as this has been accomplished, the next frame of film can be exposed by operating the handle 169 in the manner hereinbefore described to separate the film from the image intensifier and to permit a tab of the flat pack to be pulled. Thereafter, the handle can be returned to its position so as to move the film in direct intimate contact with the fiber optic face plate of the image intensifier 51. This procedure can then be repeated until the experiment has been completed and the necessary photographs taken.

In connection with the foregoing it should be appreciated that the microchannel plate collimator 204 in reality serves as a passive microchannel plate but not as a collimator. Electrons emerge with such a low velocity dispersion (0.1 eV instead of 2 to 4 eV) for x-ray initiated photoelectrons that a very long channel plate would have to be used to "trim" the beam. The aspect ratio (length to diameter) would have to be greater than 400 to 1 which would probably be too long to obtain a beam without more scattering and space charge buildup. The channel plate utilized in the camera of the present embodiment is very flat which allows greater extraction voltages to be applied between it and the photocathode than has been feasible in the past. The off-axis arrangement for the input fiber optic face plate and the off-axis alignment of the microchannel plate serves to make the camera so that visible photons cannot travel directly to the phosphor screen. It has been found that visible photons with images sufficiently bright can pass through the aluminum layer. In order to reduce background noise, the aluminum filter layer can be blackened which will absorb stray photons with a gain loss of only approximately 200 to 300 eV.

It should be appreciated since the camera 11 is positioned outside of the vacuum chamber a flat pack is utilized. However, if it is desired to utilize a camera interior of the vacuum chamber, a camera with a remotely controlled film transport such as disclosed in copending application Ser. No. 834,466, filed Sept. 19, 1977, but with a "visible" type tube can be utilized. The flat pack attachment has been constructed in such a manner that the film pack can be readily used and additional sheets of film readily brought into place without damaging the film. In addition, the film pack holder can be readily removed from the camera.

It also should be appreciated that the camera has been constructed with the drawer 22 to facilitate loading of the solid dielectric i.e. Mylar into the spark assembly. The drawer arrangement also facilitates changing of the electrode drive circuitry and for adding slow down networks where it is desired to slow down the streak rate.

Also with respect to the camera by utilizing a fiber optic input and an output for the streak tube, it is possible to eliminate the need for lenses and the consequent focusing adjustment and alignment procedures. In the streak tube, channel plate is always parallel to the photocathode surface so that the spacing between the photocathode and the microchannel plate is the same distance across the width of the plate. By providing a high electric field between the photocathode and the channel plate, it is possible to keep the high electric field out of the deflection region between the beam electrodes. The streak tube is very short and focusing is achieved by keeping the phosphor screen in relatively close proximity to the photocathode. Thus it can be seen that there has been provided a visible streak camera which has many desirable features.

What is claimed is:

1. In a proximity focused streak tube, a photocathode for converting photon images into photoelectrons, a phosphor screen for receiving said photoelectrons, said photocathode and said screen defining a longitudinal tube axis, a channel plate having a plurality of substantially parallel bores therein, the channel plate being disposed in relatively close proximity to the photocathode and so that the bores in the channel plate are inclined at an angle with respect to the longitudinal tube axis, means for applying a voltage differential between the photocathode and the channel plate to cause electrons to be extracted from the photocathode and travel in paths through the bores in said channel plate, the bores in the channel plate being arranged so that said photons cannot pass directly from said photocathode directly through said channel plate to said phosphor screen, first and second spaced apart beam electrodes disposed between the channel plate and the phosphor screen and means for applying a voltage differential between said beam electrodes to cause the photoelectrons to move in directions across said screen, said beam electrodes being arranged asymmetrically of the tube axis to compensate for the inclination of the bores in the channel plate with respect to the tube axis, said channel plate being relatively thin.

2. A streak tube as in claim 1 wherein said photocathode and said channel plate lie in substantially parallel planes.

3. A streak tube as in claim 1 wherein said photocathode is a fiber optic photocathode together with a metallic member in intimate contact with said fiber optic photocathode, said member having a slot therein through which photons must enter to strike the fiber optic photocathode.

4. A streak tube as in claim 3 together with a fiber optic face plate and wherein said phosphor screen is carried by said fiber optic face plate.

5. A streak tube as in claim 4 wherein a layer of metal covers said screen.

6. A streak tube as in claim 5 wherein said layer of metal is aluminum.

* * * * *